US008297114B2

(12) United States Patent
Ramond et al.

(10) Patent No.: US 8,297,114 B2

(45) Date of Patent: Oct. 30, 2012

(54) PRESSURE MEASURING DEVICE AND CORRESPONDING METHOD

(75) Inventors: Alain Ramond, Merville (FR); Michel Suquet, Villeneuve Tolosane (FR); Simon-Didier Venzal, Toulouse (FR)

(73) Assignee: Continental Automotive France, Toulouse (FR)

( * ) Notice: Subject to any disclaimer, the term of this patent is extended or adjusted under 35 U.S.C. 154(b) by 132 days.

(21) Appl. No.: 12/866,931

(22) PCT Filed: Feb. 4, 2009

(86) PCT No.: PCT/EP2009/000743

§ 371 (c)(1), (2), (4) Date: Oct. 27, 2010

(87) PCT Pub. No.: WO2009/100844

PCT Pub. Date: Aug. 20, 2009

(65) Prior Publication Data

US 2011/0030462 A1 Feb. 10, 2011

(30) Foreign Application Priority Data

Feb. 13, 2008 (FR) ..................................... 08 00763

(51) Int. Cl.
*G01M 15/08* (2006.01)

(52) U.S. Cl. .................................................... 73/114.16

(58) Field of Classification Search ............... 73/114.16, 73/114.18, 114.21
See application file for complete search history.

(56) References Cited

U.S. PATENT DOCUMENTS 4,292,841 A 10/1981 Wesley
4,922,188 A * 5/1990 Mario ........................... 324/130
5,062,294 A * 11/1991 Iwata ........................ 73/114.21
5,719,326 A 2/1998 Vulih et al.
7,117,725 B2 * 10/2006 Okubo et al. .............. 73/114.21
7,212,912 B2 * 5/2007 Okubo et al. ................. 701/114
7,757,545 B2 * 7/2010 Sato et al. .................. 73/114.16
8,150,602 B2 * 4/2012 Anilkumar et al. ........... 701/110
2006/0142930 A1 * 6/2006 Okubo et al. ................. 701/114
2009/0153337 A1 6/2009 Cordesses et al.
2010/0229624 A1 * 9/2010 Higuchi et al. ................ 73/1.57

FOREIGN PATENT DOCUMENTS

EP 1 674 845 A2 6/2006
FR 2 878 030 A1 5/2006
FR 2 908 184 A1 5/2008

OTHER PUBLICATIONS

International Search Report, dated May 20, 2009, from corresponding PCT application.

* cited by examiner

*Primary Examiner* — Freddie Kirkland, III
(74) *Attorney, Agent, or Firm* — Young & Thompson

(57) ABSTRACT

Device for measuring cylinder pressure of an internal combustion engine includes a pressure sensor that includes a piezoelectric element associated with a capacitive element, and an output generating a first voltage representative of the cylinder pressure. A filtering module of the device filters parasitic low-frequency voltages and generates a second voltage free of these parasitic voltages. A control module delivers a control signal that is dependent on a switching parameter correlated with a stroke. A switching module, in response to the control signal, disconnects the input of the filtering module from the output of the pressure sensor during the first stroke and connects the input of the filtering module to the output of the pressure sensor during the second stroke. The first stroke corresponds to a compression stroke or to a combustion-expansion stroke, and the second stroke corresponds to an intake stroke or to an exhaust stroke.

14 Claims, 5 Drawing Sheets

PRESSURE MEASURING DEVICE AND CORRESPONDING METHOD

The present invention relates to a device and a method for measuring pressure used in particular in the automobile industry. The invention relates in particular to a device for measuring the pressure prevailing in a cylinder of an internal combustion engine. A measuring device commonly used in this field comprises at least one pressure sensor consisting of a piezoelectric element associated with a capacitive element, generating a voltage representative of the pressure applied to said piezoelectric element.

Generally, a piezoelectric element (for example a quartz crystal) is an element sensitive to a stress, in this case a pressure F, which is applied to it. The use of such a piezoelectric element in a pressure sensor makes it possible to generate a charge Q that is proportional to the applied pressure. A charge converter, for example a capacitor of capacitance C, associated with the piezoelectric element, converts the charge Q into a first voltage V1 that is proportional to this charge Q, with V1=Q/C. The voltage V1 is therefore representative of the applied pressure.

Figure 1A:
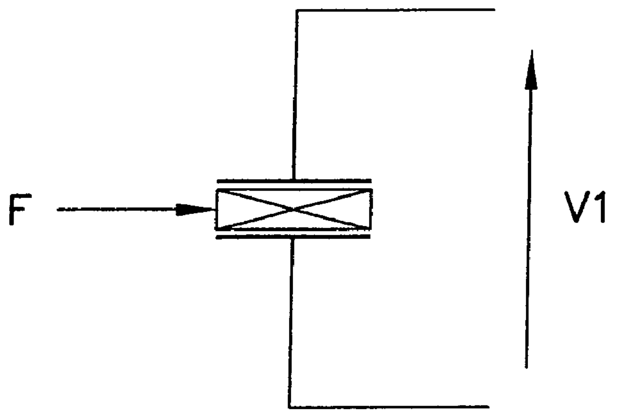

As illustrated in FIG. 1*a*, the capacitor can be an internal capacitor incorporated in the piezoelectric element (for example the capacitance of the piezoelectric element), and the first voltage V1 is then taken directly at the terminals of this piezoelectric element.

Figure 1B:
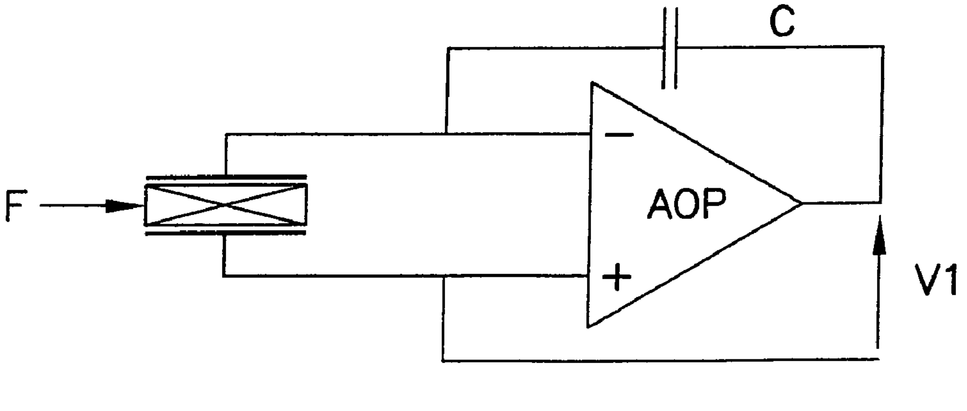

The capacitor can also be an external capacitor C. As illustrated in FIG. 1*b*, the external capacitor C is associated with an amplifier AOP (also called charge amplifier), and the first voltage V1 is taken at the output of the amplifier AOP.

Three characteristics need to be applied in order to ensure that the pressure detection signal is correctly processed:

i. a good rejection of the low-frequency and continuous components. This is vital, because otherwise there is a signal instability which is reflected in the saturation of the output signal;

ii. a retention of the bandwidth of the detected pressure signal. Otherwise, there will be a distortion of the signal, which makes it less easy to use;

iii. retention of the signal's minimum value as reference value.

It has therefore been proposed in the prior art to address this issue by using a pure integrator circuit (see FIGS. 1*a* and 1*b*). This type of circuit makes it possible to have a wide (in fact full) bandwidth, which makes it possible to convert the charges obtained from the piezoelectric element with the entire bandwidth of the useful signal and therefore without distortion. However, this retention of the bandwidth has the drawback of not offering rejection of the low-frequency components. The consequence of this is that the noises deriving from the temperature effects are allowed to pass. These temperature effects consist of the pyroelectric effect (a temperature variation leading to a variation of the electrical polarization of the piezoelectric crystal) and of expansion effects on the mechanical elements forming the sensitive element. Furthermore, this type of integrator circuit does not make it possible to overcome the leakage currents deriving from a poor insulation of the terminals of the piezoelectric element, which leads to a signal drift. This alternative is therefore neither optimal nor even satisfactory.

Figure 2A:
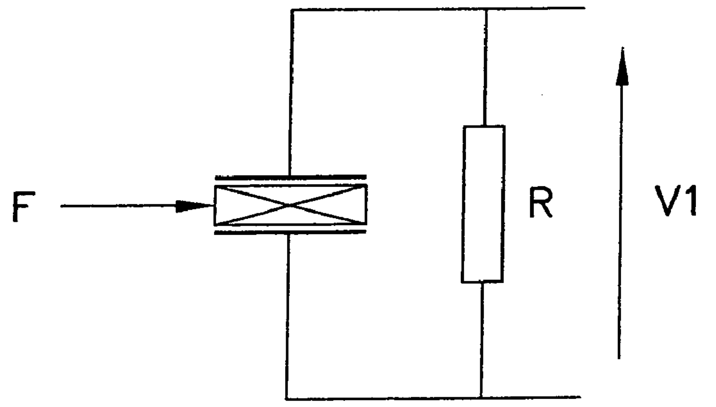
Figure 2B:
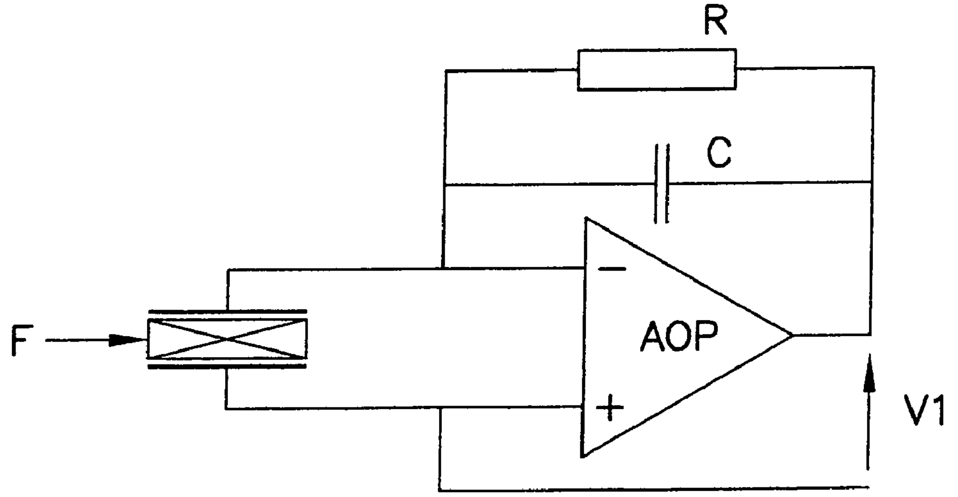

In order to stabilize this first voltage V1, another known alternative consists in placing a resistor R (or any other filter making it possible to obtain a transfer function comprising an integration function for the voltage charges and a filtering of the low frequencies) connected in parallel with the capacitor of capacitance C, as illustrated in FIGS. 2*a* and 2*b*. Since the resistor R associated with the capacitor behaves as a high-pass filter, the parasitic low-frequency voltages are then filtered and the resultant first voltage V1 is then free of these parasitic voltages.

Figure 3A:
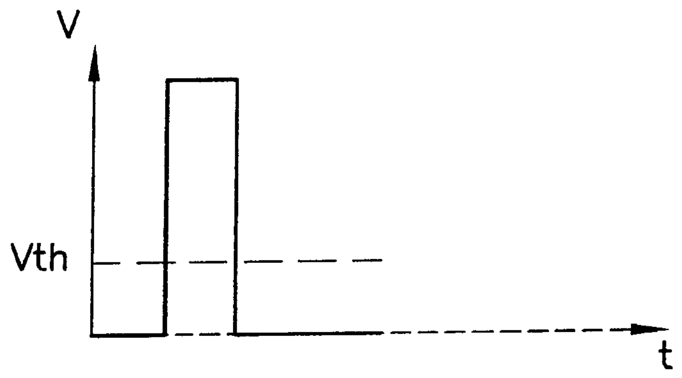
Figure 3B:
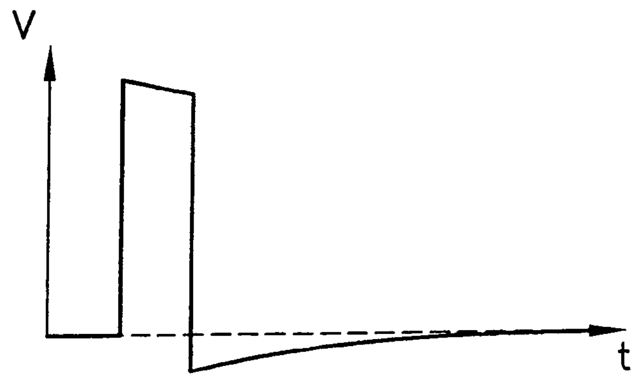

In the case of a four-stroke internal combustion engine executing a succession of cycles, each cycle is broken down into four strokes (these four strokes usually being designated "intake", "compression", "combustion-expansion", "exhaust"). During the compression and combustion-expansion strokes, the cylinder pressure can reach more than a hundred or so bar, whereas during the intake and exhaust strokes, the cylinder pressure is only a few bar. To correct the fuel injection parameters and the fuel/oxidant mixture ignition criteria, the mixture combustion start instant must be accurately determined. Moreover, when the engine is operating in a compression or combustion-expansion stroke, the trend over time of the stress applied to the piezoelectric element is comparable—broadly—to a pulsed signal as represented in FIG. 3*a*. As it happens, the solution for stabilizing the voltage at the output of the pressure sensor by means of a resistor R presents a number of drawbacks, in particular when the trend of the stress is comparable to a zero-referenced pulse, as illustrated in FIG. 3*a*. In practice, with the resistor R creating a high-pass filter, the first voltage V1 (voltage at the output of the pressure sensor) exhibits a zero continuous component. Thus, for a stress that is comparable to a signal consisting of a repetition of zero-referenced pulses, at a frequency f with a duty cycle Δ, the first voltage V1 will exhibit a variable low level, dependent on the duty cycle Δ, as shown in FIG. 3*b*. Moreover, at the end of a pulse, the first voltage V1 does not immediately revert to the reference level. In practice during the pulse, the input charge is not fully transferred into the capacitor, a portion being transferred into the resistor, which results in a loss of charge which is reflected in a voltage offset and in a distortion of the voltage at the output of the pressure sensor.

As can be seen, using the effect of rejection of the low frequencies by a high-pass filter leads to a distortion of the pressure detection signal in the case of an internal combustion engine. In practice, the signal has a bandwidth that includes very low frequencies (at the order of 0.5 Hz). The retention of the bandwidth is therefore no longer assured. Furthermore, a high-pass filter has the characteristic of affecting the average value of the signal since the filter eliminates the frequency 0 Hz, also called continuous component. Since the average value is rounded to zero, it falsifies the minimum value of the signal. Now, since this minimum value is representative of the atmospheric pressure, it can no longer be used as a reliable reference. This alternative is therefore not acceptable either.

In this context, the aim of the present invention is to propose a pressure measuring device that is free of at least one of the limitations stated above.

The invention proposes in particular to divide the signal representative of the applied pressure into two regions, and to apply an appropriate processing method for each region of the signal in order to mitigate the distortions of the signal at the output of the measuring device, one particular processing method consisting, for example, in applying or not applying a filter to eliminate the parasitic low-frequency voltages from the signal at the output of the sensor. The criterion discriminating the two regions of the signal, and therefore the application or non-application of a processing method (for example the filter) to the parasitic voltages may be, for example, a threshold voltage level, a time window synchronized on the input signal (phase locked system) or a time window defined by another sensor (for example, a sensor sensing the position of the piston—or of any other element of the moving part—of the internal combustion engine). The invention thus makes it possible to obtain a signal at the output of the measuring device that is free of distortions and of parasitic low-frequency voltages, and representative of the pressure applied to the piezoelectric element.

The objects, features and advantages of the present invention will be explained in more detail in the following description of a preferred embodiment of the invention, given as a non limiting example in relation to the appended figures in which:

FIGS. 1*a* and 1*b* are schematic diagrams of the conversion of the charge delivered by the piezoelectric element into a voltage as explained previously;

FIGS. 2*a* and 2*b* show means of stabilizing the voltage, as detailed above;

FIG. 3*a* shows the trend over time (on the x axis) of a zero-referenced pulsed signal;

FIG. 3*b* shows the distortion of the pulsed signal of FIG. 3*a;*

Figure 4A:
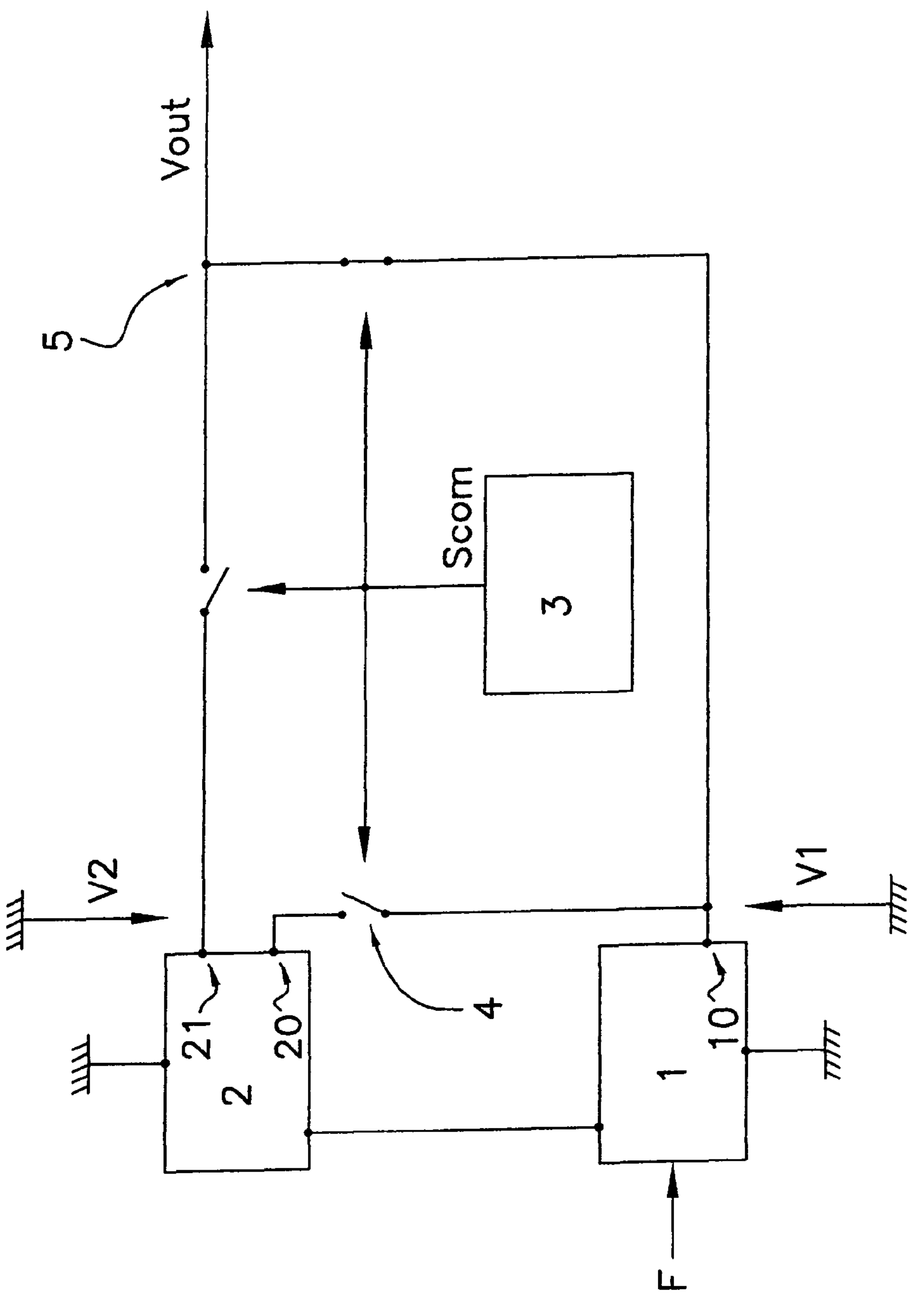
Figure 4B:
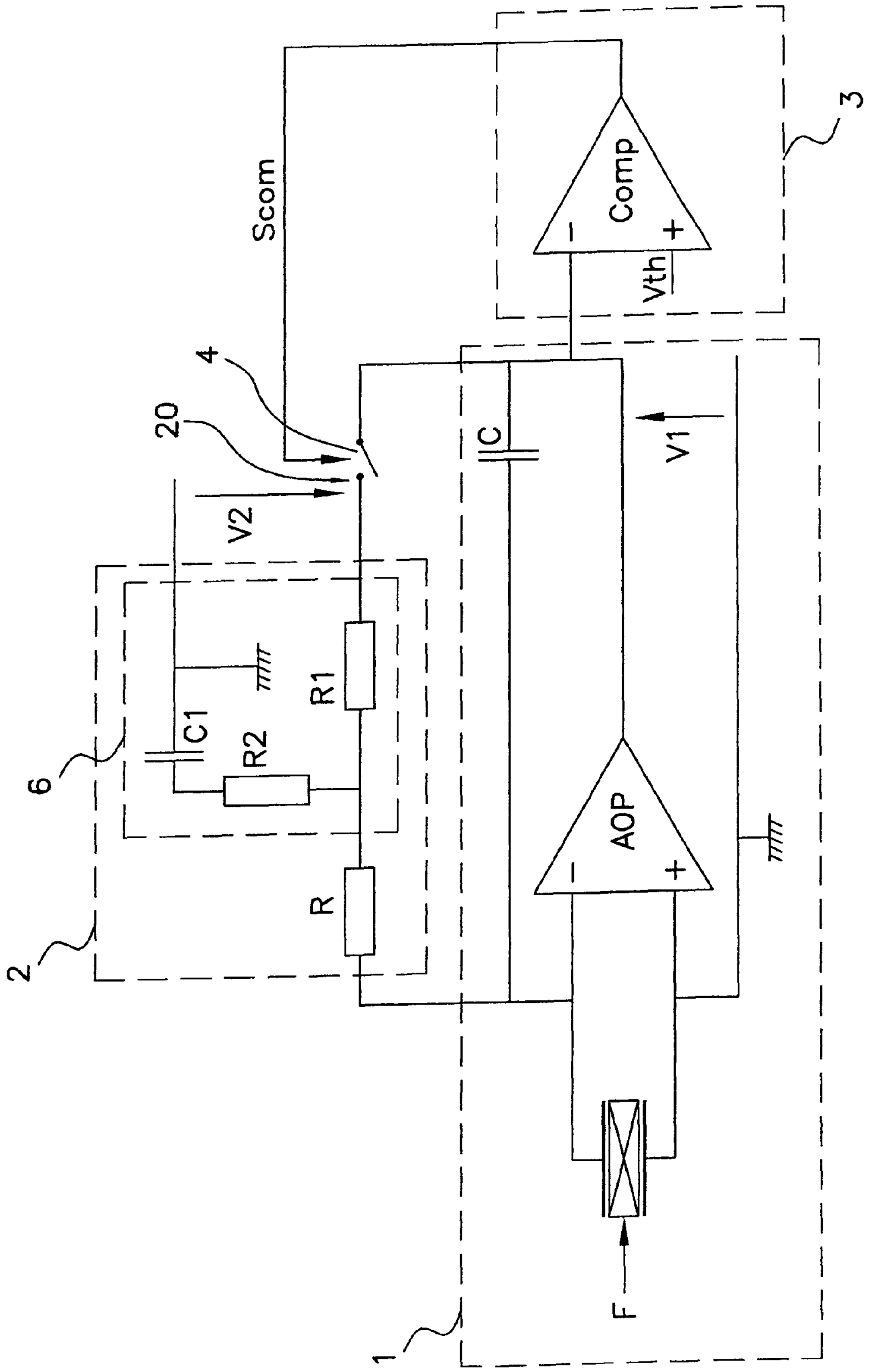

FIG. 4*a* is a schematic diagram of a measuring device according to a particular embodiment of the invention; and FIG. 4*b* shows in more detail a measuring device according to a particular embodiment of the invention.

As illustrated in FIG. 4*a*, the invention relates to a device for measuring the cylinder pressure of an internal combustion engine, the operation of which comprises a plurality of successive cycles, each cycle being broken down into at least first and second strokes, the measuring device comprising at least one pressure sensor 1 consisting of at least one piezoelectric element associated with a capacitive element, and an output 10 generating a first voltage V1 representative of a pressure applied to the piezoelectric element.

The device further comprises:

- a filtering module 2 comprising at least one input 20 and one output 21, capable of filtering parasitic low-frequency voltages present at its input 20, and of generating on its output 21 a second voltage V2 free of these parasitic low-frequency voltages;
- a control module 3 capable of delivering a control signal Scom that is dependent on a switching parameter correlated with an engine stroke, among the first and second strokes, in which the engine is operating;
- a switching module 4, in response to the control signal, capable of disconnecting the input 20 of the filtering module 2 from the output 10 of the pressure sensor 1 during the first stroke, and of connecting the input 20 of the filtering module 2 to the output 10 of the pressure sensor 1 during the second stroke; and
- an output 5 generating an output voltage Vout equal to the first voltage V1 during the first stroke, and equal to the second voltage V2 during the second stroke.

The first stroke corresponds, for example, to a compression stroke or to a combustion-expansion stroke, and the second stroke corresponds, for example, to an intake stroke or to an exhaust stroke.

The device can further comprise an amplifier, a first input of which is connected to a first terminal of the piezoelectric element, a second input of which is connected to a second terminal of the piezoelectric element, and an output of which is connected to the output of the pressure sensor, the capacitive element being connected between the output of the pressure sensor and the first input of the amplifier.

FIG. 4*b* shows a particular embodiment of the invention, in which the piezoelectric element, the capacitor of capacitance C and an amplifier AOP form the pressure sensor 1, the capacitor associated with the amplifier converting the charge Q delivered by the piezoelectric element into a first voltage V1.

The switching parameter is, for example, the result of a comparison of the first voltage V1 with a threshold voltage Vth, the engine operating in the first stroke when the first voltage is at least equal to the threshold voltage, and the engine operating in the second stroke when the first voltage is less than the threshold voltage.

Preferably, during the first stroke, the applied pressure is comparable to a pulse of short duration and the first voltage V1 is greater than the threshold voltage Vth, and during the second stroke, the first voltage applied is less than the threshold voltage Vth, as illustrated in FIG. 3*a*. In these conditions, the use of the capacitor without filtering module during the first stroke makes it possible to generate an output voltage Vout that is distortion-free, the capacitor acting as a filter with a cut-off frequency of 0 Hz. During the second stroke, the association of the filtering module with the pressure sensor makes it possible to generate an output voltage that is free of the parasitic low-frequency voltages. As an example, the threshold voltage Vth may be representative of a pressure of five bar (5 bar).

In the particular example of FIG. 4*b*, the control module 3 is a comparator Comp comparing the first voltage V1 with the threshold voltage Vth, for example Vth=5 volts. When the first voltage V1 is greater than or equal to the threshold voltage Vth, it is considered in this particular embodiment that the stress is comparable to a pulse or that the engine is operating in a compression stroke or combustion-expansion stroke, the comparator then generating a control signal Scom to command the switching module 4, in this case a switch, not to connect the filtering module 2 to the pressure sensor 1. The output voltage Vout generated at the output 5 of the measuring device will then be equal to the first voltage V1. When the first voltage V1 is less than the threshold voltage Vth, it is considered in this particular embodiment that the stress is no longer comparable to a pulse or that the engine is operating in an intake or exhaust stroke, and the control signal Scom generated by the comparator Comp commands the switching module 4 to connect the filtering module 2 to the pressure sensor 1. The parasitic low-frequency voltages present in the first voltage V1 (voltage at the output of the pressure sensor) are then filtered by the filtering module 2 and the output voltage Vout generated at the output 5 of the measuring device will then be equal to a second voltage V2 representative of the first voltage V1 free of these parasitic low-frequency voltages.

The switching parameter may be a time window delimited according to the position of a piston of the engine and to a reference pressure curve correlated with the engine, the engine operating in the first stroke within this time window, and the engine operating in the second stroke outside this time window.

In practice, since the pressure in the cylinder depends on the position of the piston in said cylinder, determining its position (using a crankshaft position sensor for example) makes it possible, by referring to a reference curve for the pressure in the cylinder, to determine time windows in which the pressure is comparable to a zero-referenced pulsed signal.

The filtering module 2 may be an nth order low-pass filter 6 connected in parallel with the capacitive element, n being a positive integer number.

The filtering module 2 may be also be a resistor R connected in parallel with the capacitive element.

Preferably, the filtering module 2 is connected in parallel with the capacitive element and consists of the resistor R associated with the nth order low-pass filter 6, the nth order low-pass filter 6 associated with the resistor R forming an n+1th order low-pass filter.

In the particular example of FIG. 4*b*, the low-pass filter 6 that is used comprises in particular a first capacitor C1 and first and second resistors R1 and R2.

As an illustrative example that is by no means limiting in itself, R=10 MΩ, R1=1 MΩ, R2=300 KΩ, C=1200 pF and C1=2 μF.

Another subject of the invention is a method for measuring the cylinder pressure of an internal combustion engine, the operation of which comprises a plurality of successive cycles, each cycle being broken down into at least first and second strokes, the method consisting in at least generating a first voltage V1 representative of a pressure F applied to a piezoelectric element associated with a capacitive element.

The method comprises the following steps:

- delivering a control signal Scom that is dependent on a switching parameter correlated with an engine stroke, among the first and second strokes, in which the engine is operating;
- when the switching parameter is correlated with the first stroke, generating an output signal Vout equal to the first voltage V1, in response to the control signal Scom; and
- when the switching parameter is correlated with the second stroke, filtering the parasitic low-frequency voltages present in the first voltage V1, and generating an output signal Vout equal to a second voltage V2 representative of the first voltage V1 free of these parasitic low-frequency voltages, in response to the control signal.

The invention claimed is:

1. A device for measuring the cylinder pressure of an internal combustion engine that operates with a plurality of successive cycles, each cycle being broken down into at least first and second strokes, the measuring device comprising:

- at least one pressure sensor (1) comprising at least one piezoelectric element associated with a capacitive element, and an output (10) generating a first voltage (V1) representative of a pressure (F) applied to the piezoelectric element;
- a filtering module (2) comprising at least one input (20) and one output (21), capable of filtering parasitic low-frequency voltages present at its input (20), and of generating on its output (21) a second voltage (V2) free of these parasitic low-frequency voltages;
- a control module (3) capable of delivering a control signal (Scom) that is dependent on a switching parameter correlated with a stroke, among the first and second strokes, in which the engine is operating;
- a switching module (4), in response to the control signal (Scom), capable of disconnecting the input (20) of the filtering module (2) from the output (10) of the pressure sensor (1) during the first stroke, and of connecting the input (20) of the filtering module (2) to the output (10) of the pressure sensor (1) during the second stroke; and
- an output (5) generating an output voltage (Vout) equal to the first voltage (V1) during the first stroke, and equal to the second voltage (V2) during the second stroke,
- wherein the first stroke corresponds to a compression stroke or to a combustion-expansion stroke, and in which the second stroke corresponds to an intake stroke or to an exhaust stroke.

2. The device as claimed in claim 1, in which the switching parameter is the result of a comparison of the first voltage (V1) with a threshold voltage (Vth), the engine operating in the first stroke when the first voltage (V1) is at least equal to the threshold voltage (Vth), and the engine operating in the second stroke when the first voltage (V1) is less than the threshold voltage (Vth).

3. The device as claimed in claim 2, in which the filtering module (2) is an nth order low-pass filter connected in parallel with the capacitive element, n being a positive integer number.

4. The device as claimed in claim 2, in which the filtering module (2) is a resistor connected in parallel with the capacitive element.

5. The device as claimed in claim 2, in which the filtering module (2) is connected in parallel with the capacitive element and consists of an associated resistor.

6. The device as claimed in claim 1, in which the switching parameter is a time window delimited according to the position of a piston of the engine and to a reference pressure curve correlated with the engine, the engine operating in the first stroke within this time window, and the engine operating in the second stroke outside this time window.

7. The device as claimed in claim 6, in which the filtering module (2) is an nth order low-pass filter connected in parallel with the capacitive element, n being a positive integer number.

8. The device as claimed in claim 6, in which the filtering module (2) is a resistor connected in parallel with the capacitive element.

9. The device as claimed in claim 6, in which the filtering module (2) is connected in parallel with the capacitive element and consists of an associated resistor.

10. The device as claimed in claim 1, in which the filtering module (2) is an nth order low-pass filter connected in parallel with the capacitive element, n being a positive integer number.

11. The device as claimed in claim 1, in which the filtering module (2) is a resistor connected in parallel with the capacitive element.

12. The device as claimed in claim 1, in which the filtering module (2) is connected in parallel with the capacitive element and consists of an associated resistor.

13. The device as claimed in claim 1, in which the device further comprises an amplifier (AOP), a first input of which is connected to a first terminal of the piezoelectric element, a second input of which is connected to a second terminal of the piezoelectric element, and an output of which is connected to the output (10) of the pressure sensor (1), the capacitive element being connected between the output (10) of the pressure sensor and the first input of the amplifier (AOP).

14. A method for measuring the cylinder pressure of an internal combustion engine that operates with a plurality of successive cycles, each cycle being broken down into at least first and second strokes, the method comprising:

- generating a first voltage (V1) representative of a pressure (F) applied to a piezoelectric element associated with a capacitive element;
- delivering a control signal (Scom) that is dependent on a switching parameter correlated with an engine stroke, among the first and second strokes, in which the engine is operating;
- when the switching parameter is correlated with the first stroke, generating an output signal (Vout) equal to the first voltage (V1), in response to the control signal (Scom); and
- when the switching parameter is correlated with the second stroke, filtering the parasitic low-frequency voltages present in the first voltage (V1), and generating an output signal (Vout) equal to a second voltage (V2) representative of the first voltage (V1) free of these low-frequency voltages, in response to the control signal (Scom), the first stroke corresponding to a compression stroke or to a combustion-expansion stroke, and the second stroke corresponding to an intake stroke or to an exhaust stroke.

* * * * *